United States Patent [19]

Umezawa et al.

[11] Patent Number: 4,725,869

[45] Date of Patent: Feb. 16, 1988

[54] DISPLAY DEVICE OF COPYING MACHINE

[75] Inventors: Hideo Umezawa, Amagasaki; Hideyuki Ujihira, Sakai; Shigeo Kurando, Takatsuki; Tetsuji Kajitani, Kawanishi; Hiroshi Kajita, Kobe; Yasuji Sumida, Nara, all of Japan

[73] Assignee: Mita Industrial Co., Ltd., Japan

[21] Appl. No.: 880,860

[22] Filed: Jul. 1, 1986

[30] Foreign Application Priority Data

Jul. 5, 1985 [JP] Japan ........................... 60-103244[U]
Jul. 8, 1985 [JP] Japan ........................... 60-104351[U]

[51] Int. Cl.⁴ ............................................ G03B 27/32
[52] U.S. Cl. ........................................ 355/24; 355/40; 355/72; 355/59
[58] Field of Search ........................ 355/72, 74, 40, 59, 355/24, 56

[56] References Cited

U.S. PATENT DOCUMENTS 4,240,744 12/1980 Rapp et al. ............................ 355/74
4,511,241 4/1985 Tsudaka et al. .
4,568,173 2/1986 Abuyama .............................. 355/56

*Primary Examiner*—Monroe H. Hayes
*Attorney, Agent, or Firm*—Beveridge, DeGrandi & Weilacher

[57] ABSTRACT

A display device for a copying machine, wherein when a special mode such as copying with reduction and duplex copying (copying on both surfaces of a copying paper) is selected, it is judged whether the paper feed cassette set for copying is proper for the mode selected and if so, the paper feed cassette set for copying is displayed, while if not, the applicable paper feed cassettes are displayed successively, and furthermore, the paper size stacked in the paper feed cassette is displayed regardless of whether it is in the metric size system or the inch size system.

2 Claims, 7 Drawing Figures

DISPLAY DEVICE OF COPYING MACHINE

BACKGROUND OF THE INVENTION

This invention relates to a display device for a copying machine. More particularly, the invention relates to the device within a copying machine which displays an indication of the applicable paper feed cassette when a special mode, such as copying with reduction or duplex copying (copying on both surfaces of a copying paper), is selected, and particularly which displays the paper size stacked in the applicable paper feed cassette, regardless of the metric or inch size system thereof.

In response to an indication of strong market needs, copying machines are being offered with more and more multi-function features and special functions, including reduced size copying and so called duplex copying.

Should an original document be copied in a special mode, such as duplex copying, certain sizes of copying paper are necessary to provide normal copying images corresponding to the original, while other sizes are not usable for that purpose. To solve the above inconvenience, known copying machines can illuminate a display indicative of the paper feed cassette set for copying, informing the operator that the paper size stacked in the paper feed cassette is not appropriate for obtaining normal copying images. Such copying machines inform the operator thereof that the applicable paper feed cassette has not been selected.

However, an unskilled operator may need to refer to a manual to find out what paper feed cassette is suitable, even if such operator is informed that the paper feed cassette set for copying is not applicable, thus causing the operator inconvenience. Moreover, if the copying is carried out with the paper feed cassette not properly selected, not only is time wasted because normal copying images corresponding to the original are not obtained, but also copying paper is consumed uselessly. Therefore, further improvement of the display device of the copying machine is desirable.

Moreover, the following conventional types of paper size display devices are known which give information such as the original size, the copying paper size, etc. to the operator: (1) a display device, wherein various paper sizes are displayed on a display sheet, and luminophores such as light-emitting diodes (LEDs) are attached near to the aforementioned displays of the copying paper size, (2) a display device, wherein the display sheet is formed as a light-transmissible display of copying paper size while the luminophores such as LEDs are attached below the aforementioned respective displays and (3) a display device provided with a plurality of luminous segments consisting of fluorescent displays and others so that the combination of the luminous segments is controlled in order to display the paper size. Display devices of the construction as described in (1) and (2) above can display a wide range of paper sizes through an increase in the number of displays and the luminophores corresponding to the paper sizes; however, the surface area required for the displays must be unreasonably expanded according to the increased number of paper sizes and, consequently, displays.

On the other hand, in the display device of the construction as described in (3) above, the surface area required for the displays does not increase, even if the number of paper sizes is increased.

However, the paper sizes and the identification systems thereof are different between Japan, Europe and the United States of America; i.e., metric sizes belonging to the A- and B-series are mainly used in Japan, Europe and some other countries, while in the United States of America, the longitudinal and transverse length of the papers are measured in inches and the identification of both lengths is used for identifying the papers. Thus, the identification systems themselves are completely different between the two market zones. Therefore, copying machines should be provided with only one type of the display segments, for the metric and the inch size identification system according to the countries in which the copying machine is to be used. A copying machine having both types of displays should be made if the destination countries are diversified.

It is also impossible for any copying machine that is provided with metric size display segments to satisfy the strong needs for displaying computer paper size as one type of the inch size system papers.

SUMMARY OF THE INVENTION

The main object of the present invention is to solve the aforementioned problems and to provide an easily applicable display device for a copying machine.

Another object of the invention is to provide a display device for a copying machine which any unskilled operator can operate easily and properly, reducing the useless loss of copying papers.

Further, another object of the invention is to provide a display device for a copying machine, which displays not only the non-selection of the proper paper feed cassette, but also the type thereof.

Still another object of the invention is to provide a display device for a copying machine which displays paper sizes in both the metric and the inch size systems without any increase in the surface area required for the displays.

In order to realize the aforementioned objects, a display device for a copying machine according to the invention comprises mode selecting means which selects duplex copying mode, copying with reduction mode, copying with enlargement mode, etc.; memory means which stores applicable types of paper feed cassettes corresponding to the modes selectable by the mode selecting means; detection means which detects the type of paper feed cassette set for copying; judge means which determines whether the type of paper feed cassette detected by the detection means coincides with the type of paper feed cassette stored in the memory means; and display means which carries out selectively the display of the paper feed cassette set for copying or the successive displays of applicable paper feed cassettes according to the outputs from the judge means.

The aforementioned modes to be selected include a variable magnification mode such as copying with reduction and copying with enlargement, a duplex copying mode for copying on both surfaces of a copying paper, an editing mode for copying only a part of an original, and a split page copying mode, corresponding to the multi-function features of modern copying machines.

Moreover, the display device according to the invention comprises a display control means, to which signals indicating the paper size are applied, and a display means displaying signals from the display control means. The display means comprises segments for displaying the sign "A" or "B" corresponding to the paper size, a pair of segments for displaying a number of units and a number of tens selectively, another pair of segments for displaying the symbol "½" and a segment for displaying the multiplication symbol.

The above display control means receives switching signals indicative of the possible original sizes, detection signals indicative of the original size from the document feeder attached to the copying machine, cassettes stage switching signals for selecting the paper feed cassettes to be set to a receiving stage of the copying machine, detection signal indicative of the paper feed cassette and display switching signals indicative of metric and inch size systems.

Furthermore, a display device of a copying machine according to the invention comprises mode selecting means for copying with reduction or enlargement; memory means which stores the type of paper feed cassette corresponding to the mode selectable by each mode selecting means; detection means which detects the type of paper feed cassette set for copying; judge means which determines whether the type of paper feed cassette detected by the detection means coincides with that stored by the memory means for the selected copying mode; display control means receiving signals corresponding to the paper sizes as an input; and display means for displaying signals from the judge means and the display control means, the display means including segments which give selectively the display of the paper feed cassette selected according to the output of the judge means or the successive displays of the applicable paper feed cassettes; segments for displaying the signs "A" and "B"; a pair of segments for displaying selectively numerals of units and numerals of tens, another pair of segments for displaying the symbol "½" and a segment for displaying the multiplication symbol.

The aforementioned and other objects of the invention are clearly understood from the following detailed description with reference to the attached drawings.

DETAILED DESCRIPTION OF THE PREFERRED EMBODIMENTS

The present invention is described in detail with reference to the attached drawings showing the preferred embodiments thereof.

Figure 1:
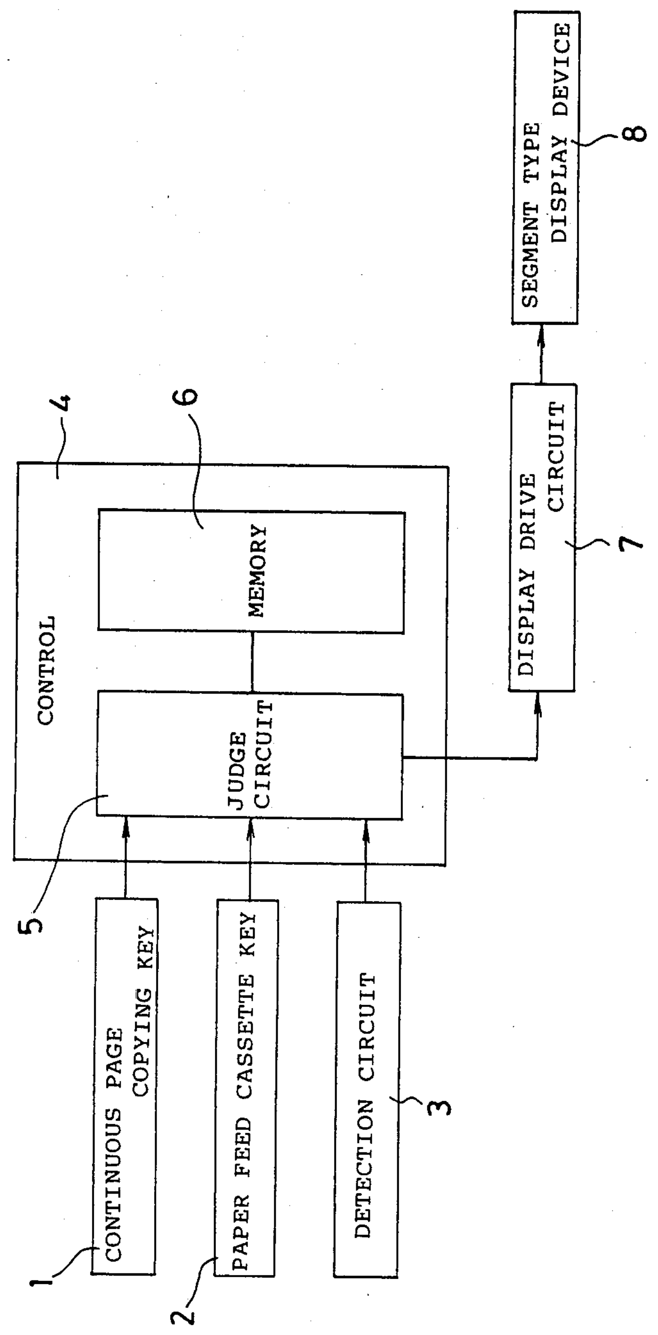
FIG. 1 is a block diagram showing one embodiment of a display device for paper feed cassettes.

FIG. 1 shows a block diagram of one preferred embodiment of the invention. A split page copying key 1 is provided as a mode selection means which selects the copying of each page without replacement of a book as the original. Signals from split page copying key 1, signals from a paper feed cassette key 2, which selects paper feed cassette which contains copying papers and is set to a receiving stage of the copying machine, and signals from a detection circuit 3, which detects the type of paper feed cassettes, are transmitted to the judge circuit 5 of the control 4. The control 4 includes the judge circuits 5 and a memory 6, which stores the types of paper feed cassette applicable in the split page copying mode. Discrimination signals from the judge circuit 5 are applied to a display drive circuit 7 which, in turn, applies the drive signals to a segment type display device 8 which carries out selectively display of the paper feed cassette or successive displays of applicable feed cassettes.

Figure 2:
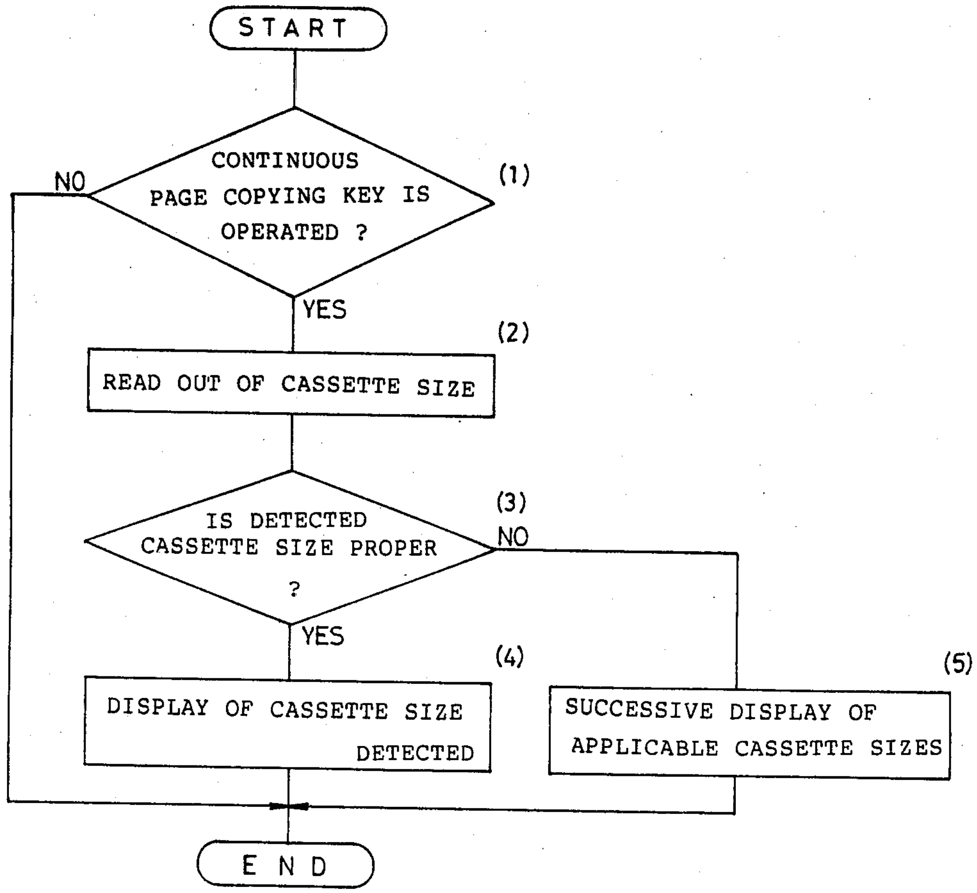
FIG. 2 is a flow chart thereof.
Figure 3:
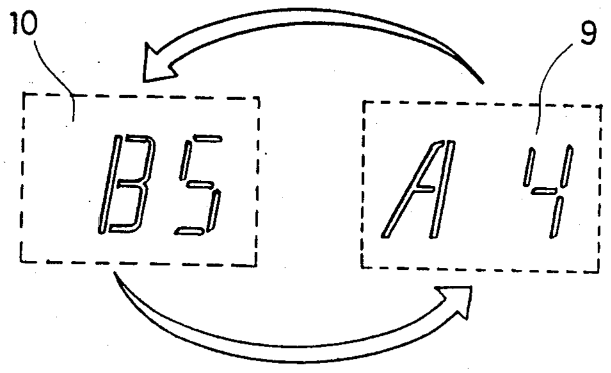
FIG. 3 shows successive displaying conditions of the paper feed cassettes.

Operation of the display device for paper feed cassettes is illustrated in FIG. 2. Judge circuit 5 determines whether the split page copying key 1 is operated or not in step (1), i.e., whether the split page copying mode is selected or not. If the judge circuit 5 determines that the split page copying mode has been selected, detection circuit 3 detects in step (2) the size of copying paper stacked in the paper feed cassette. Then in step (3), it is determined whether the paper feed cassette detected by detection circuit 3 is proper or not, i.e. whether the paper feed cassette contains copying paper of the size which is able to form normal copying images for each page or not. This determination is carried out by checking the coincidence of the type of paper feed cassette detected by the detection device 3 with that stored in the memory 6. If judge circuit 5 determines that the paper feed cassette has been properly selected for normal copying corresponding to the original, the display drive circuit 7 drives the segment type display device 8 in step (4) so as to display the paper feed cassette set for copying. Conversely, if judge circuit 5 determines that the paper feed cassette has been improperly selected for normal copying corresponding to the original, display drive circuit 7 drives the segment type display device 8 in step (5), displaying successively the paper feed cassettes corresponding to applicable copying papers. For display methods in the segment type display device 8, copying machines used in Japan, Europe and other countries are adopting the display method which displays alternatively the size identification based on A4 series 9 and B5 series 10 as shown in FIG. 3. All processes from step (2) to step (5) are omitted if it is determined in step (1) that the split page copying mode has not been selected. Therefore, if the proper paper feed cassette is selected after the selection of the split page copying mode, that paper feed cassette can be displayed directly. To the contrary, if an improper paper feed cassette is selected, the applicable proper paper feed cassettes are successively displayed, the improper selection of the paper feed cassette and a proper paper feed cassette to be selected can be indicated. Therefore, any unskilled operator can easily and exactly select the proper paper feed cassette and avoid loss of copying papers due to mis-operation in handling a copying machine with complicated functions.

Moreover, the above mode selection means may include a variable magnification mode for copying with reduction or enlargement of the original, an editing mode for copying only part of the original, or a duplex copying mode for copying on both surfaces of copying paper, in addition to the aforementioned split page copying mode. Such mode selecting means can display the proper paper feed cassette corresponding to each mode and can selectively successively display the proper paper feed cassettes to be selected if an improper cassette has been selected.

Figure 4:
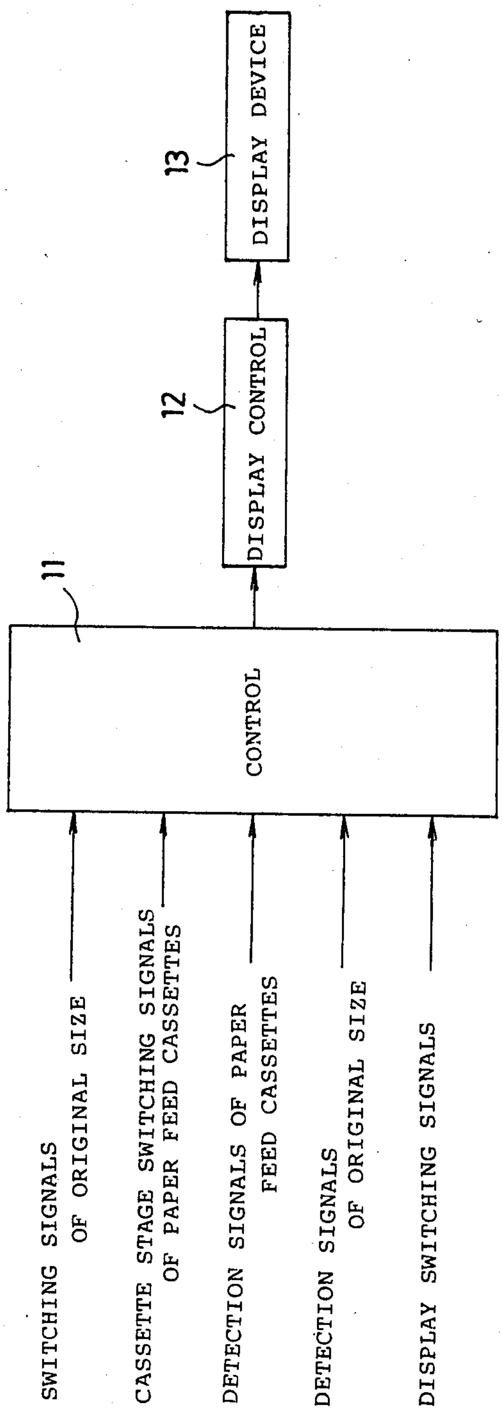
FIG. 4 is a block diagram of another embodiment of a paper size display device.

An example of the selective display of the paper size based on the metric size system and the inch size system is given in FIG. 4 showing a block diagram for another embodiment of the invention, wherein switching signals of the original size, detection signals of the original size from a document feeder attached to the copying machine (not shown), cassette stage switching signals of the paper feed cassettes set to a receiving stage of the copying machine, detection signals of the paper feed cassettes and display switching signals between the metric size system and the inch size system are transmitted to the control 11, which transmits the control signals thereof to a display control 12, which in turn transmits the control signal thereof to the display device 13.

Figure 5:
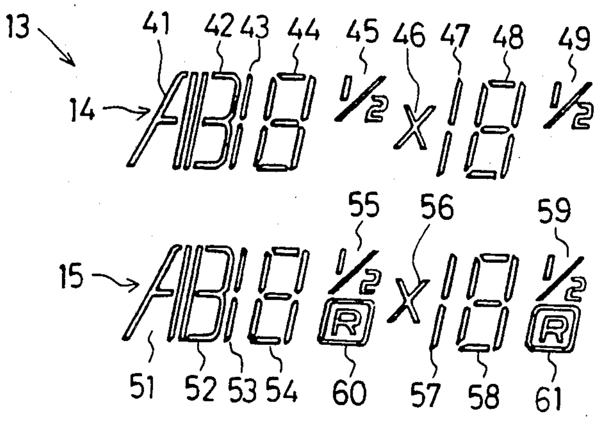
FIG. 5 shows the display device itself.

Moreover, as shown in FIG. 5, the display device 13 includes a display part 14 of the original size and another display part 15 of the copying paper size, both display parts 14, 15 being made up of a plurality of segments. The display part 14 of the original size includes a segment 41 for displaying the sign "A" corresponding to the A series of the metric size system, a segment 42 for displaying the sign "B" corresponding to the B series of the metric size system, a segment 43 displaying the numeral "1" corresponding to a number of tens, segments 44 which are arranged in a numeral "8"-shaped form as a whole in order to selectively display all numerals corresponding to a number of units, a segment 45 displaying the symbol "½", a segment 46 displaying the multiplication symbol "X" and other segments 47, 48, 49, which have forms and arrangements the same as those of the aforementioned segments 43, 44, 45.

On the other hand, the display part 15 of copying papers includes the segments 51, 52 to 59, which have forms and arrangements the same as those of the respective segments for the aforementioned display part 14 of the original size. Display part 15 also includes segments 60, 61, which are positioned just below the segments 55, 59 and which display the sign "R" surrounded by a frame of a nearly square form. The sign "R" is illuminated when copying papers are suitable for copying with reduction, indicating the copying papers set for longitudinal feedings. All of the aforementioned segments are constructed by fluorescent display tubes or other means.

In the paper size display device with the construction as described above, control part 11 is switched to either the metric size display or the inch size display according to the corresponding switching signal. When control part 11 is switched to the metric size system, the combination of the illuminated segments 41, 42, 44 in display part 14 of the original size are controlled according to the switching signal of the original size or the detection signals of the original size from the original supply device, in order to display the original size in A or B series.

When control part 11 is switched to the inch size system on the other hand, the combination of the illuminated segments 43, 44 to 49 in display part 14 of the original size are controlled according to the switching signal of the original size or the detection signals of the original size from the original supply device, in order to display the original size in the inch size system.

When control part 11 is switched to the metric size system, the combination of the illuminated segments 51, 52, 54, 60 in display part 15 of the copying paper size are controlled according to the cassette stage switching signals of the paper feed cassettes or the detection signals of the paper feed cassettes in order to display the copying paper size in A and B series.

When control part 11 is switched the the inch size system, the combination of the illuminated segments 53, 54 to 61 in display part 15 of the copying paper size are controlled according to the cassette stage switching signals or the detection signal of the paper feed cassette in order to display the original size in the inch size system.

Figure 6:
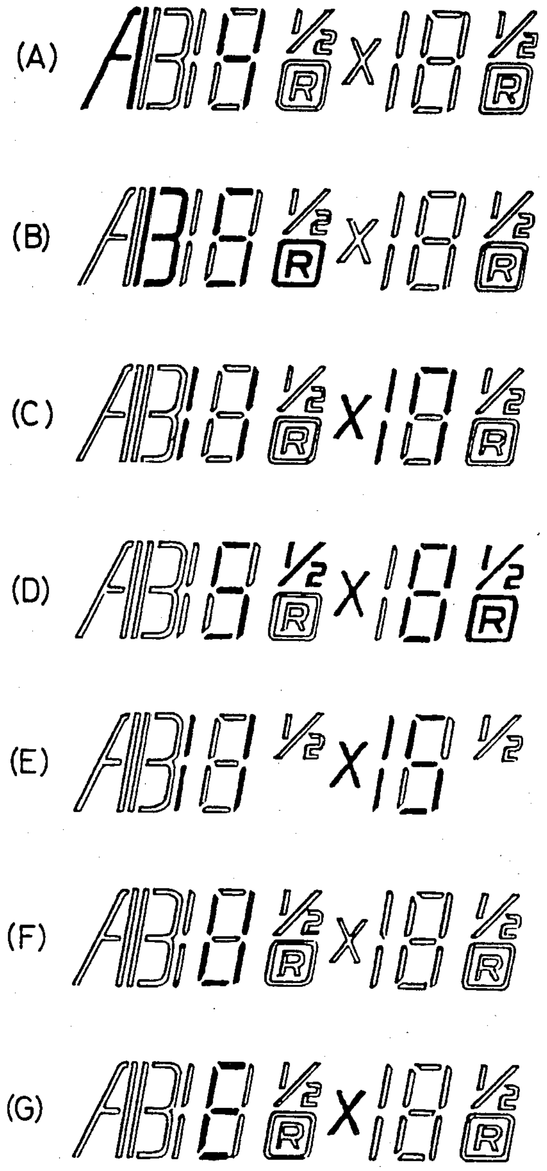
FIG. 6 shows examples of the display.

In the aforementioned display device, the paper sizes are displayed clearly as shown in FIG. 6. Part (A) of FIG. 6 indicates copying paper of A4 size. Part (B) of FIG. 6 indicates copying paper positioned in a longitudinal direction of B5 size. Part (C) of FIG. 6 indicates copying paper of 11 inch×17 inch size. Part (D) of FIG. 6 indicates copying paper of 5.5 inch×8.5 inch size. Part (E) of FIG. 6 indicates copying paper of computer size: 11 inch×15 inch. Part (F) of FIG. 6 indicates a universal cassette to contain paper of any size. Part (G) of FIG. 6 indicates a special cassette to contain paper of a size such as postcard size. By using the aforementioned paper size display device, it is possible to display the paper sizes in the metric size system and the inch size system without complicating the construction of the paper size display device.

Furthermore, it is possible to construct the display device for a copying machine according to the invention by combining the aforementioned embodiment comprising the mode selecting means, memory means, judge means, etc. with the other aforementioned embodiment comprising the display control means and display means.

Figure 7:
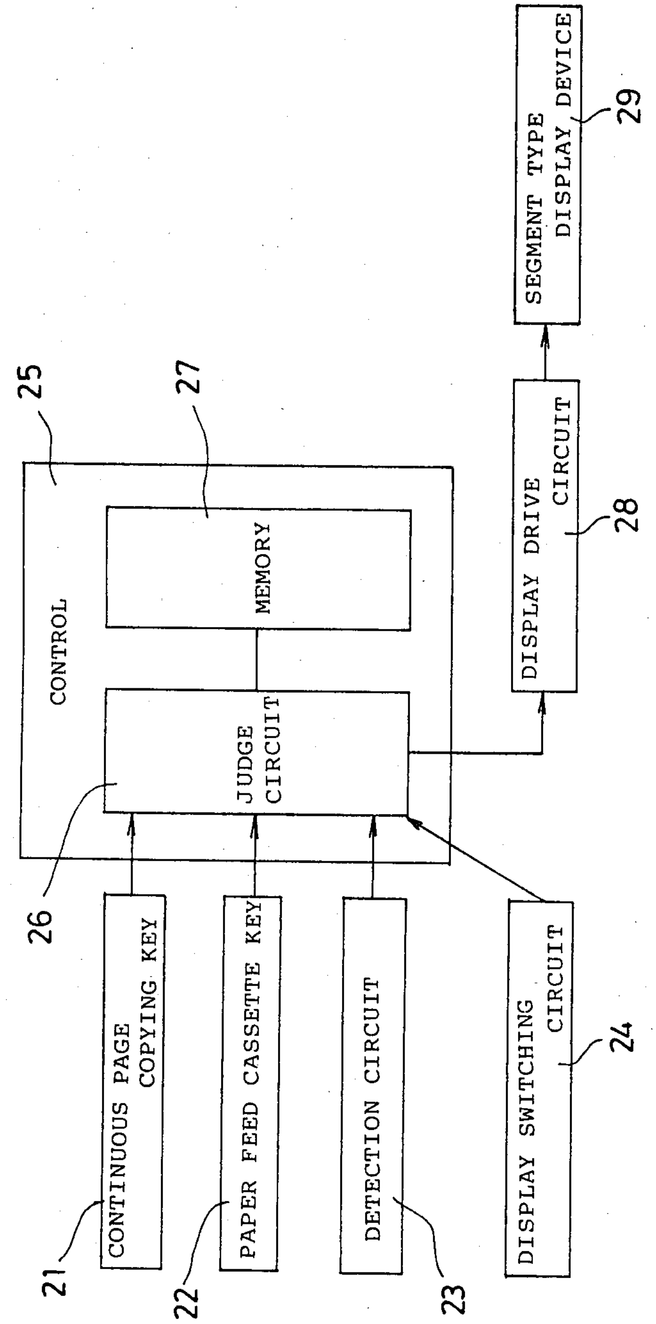
FIG. 7 is a block diagram showing a further embodiment of a display device for paper feed cassettes.

For example, as shown in FIG. 7, signals from the mode selecting means such as the split page copying key 21, signals from the paper feed cassette key 22, signals from the detection circuit 23 of paper feed cassette, and signals from the display switching circuit 24 of metric size and inch size are transmitted to the control part 25 comprising the judge circuit 26 and the memory 27, while signals from the judge circuit 26 are transmitted to the display drive circuit 28, which in turn transmits signals to the segment type display device 29. Moreover, the segment type display device 29, displaying signals from the judge circuit 26 and the display drive circuit 28, comprises segments 41, 42, 51, 52 displaying the signs "A" and "B", segments 43, 47, 53, 57 displaying the numeral "1" corresponding to a number of tens, segments 44, 48, 54, 58, which are arranged in a numeral "8"-shaped form as a whole and display all numerals selectively corresponding to a number of units, segments 45, 49, 55, 59 displaying the symbol "½", segments 46, 56 displaying the multiplication symbol "X" and segments 60, 61, which are positioned just below the segments 55, 59 and which display the sign "R" surrounded by a frame of nearly square form.

The display device with the above construction for a copying machine can indicte and display non-selection of the proper paper feed cassette or the type of proper paper feed cassette, regardless of the metric size system or the inch size system; therefore, any unskilled operator can properly operate any copying machine with diversified functions.

The preferred embodiments and some modification thereof are described in detail; however, it is clearly understood that this invention is not limited to the aforementioned embodiments and is modifiable within the scope of the invention.

What we claim is:

1. A display device for a copying machine capable of operation in any of a plurality of available copying modes, and having a plurality of paper feed cassettes, each copying mode utilizing a corresponding type of paper feed cassette, and means for setting one of the paper feed cassettes for operation in a copying action, said display device comprising:

mode selecting means for selecting a copying mode from the plurality of available copying modes and providing a signal indicative of the mode selected;

information signal providing means for providing swtiching signals indicative of an original document size or detection signals indicative of an original document size from an original supply device, cassette stage switching signals or detection signals indicative of paper supply cassettes, and display switching signals indicative of the metric size system and the inch size system;

detection means for detecting the type of paper feed cassette set for operation in the copying action and providing signals indicative thereof;

display control means for receiving the signals from said mode selecting means, said information signal providing means, and said detection means and generating display signals in response thereto, said display control means including memory means for storing the type of paper feed cassette corresponding to each mode selectable by said mode selecting means and storing the copying mode selected by said mode selecting means, and judge means for determining whether or not the type of paper feed cassette detected by said detection means coincides with the copying mode as stored in said memory means; and display means for receiving the display signals from said control and providing a corresponding display, said display means including a first display area for selectively displaying original size and a second display area for selectively displaying either the paper feed cassette type detected by said detection means or successive displays of applicable paper feed cassettes according to the determination by said judge means, each of said display areas having display segments permitting alternative displaying of the signs "A" and "B", a pair of display segments for selectively displaying numerals of units and numerals of tens, another pair of display segments for displaying the symbol "½", and a display segment for displaying a multiplication signal.

2. A display device for a copying machine according to the claim 1, wherein said mode selecting means permits selecting one of a variable magnification copying mode for reduction copying or enlargement copying of an original, a duplex copying mode for copying on both surfaces of copying paper, an editing copying mode for copying only a part of an original, and a split page copying mode.

* * * * *